United States Patent
Peterson et al.

(10) Patent No.: US 11,776,581 B1
(45) Date of Patent: Oct. 3, 2023

(54) SMART COMMUNICATIONS WITHIN PRERECORDED CONTENT

(71) Applicant: Lenovo (Singapore) Pte. Ltd., New Tech Park (SG)

(72) Inventors: Nathan Peterson, Oxford, NC (US); Russell Speight VanBlon, Raleigh, NC (US); Arnold Weksler, Raleigh, NC (US); Mark Delaney, Raleigh, NC (US); John C. Mese, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/731,798

(22) Filed: Apr. 28, 2022

(51) Int. Cl.
*G11B 27/34* (2006.01)
*H04L 65/403* (2022.01)

(52) U.S. Cl.
CPC .......... *G11B 27/34* (2013.01); *H04L 65/403* (2013.01)

(58) Field of Classification Search
CPC .......... H04L 65/00–65/80; G11B 27/30–27/34
See application file for complete search history.

(56) References Cited

U.S. PATENT DOCUMENTS

| | | | |
|---|---|---|---|
| 10,386,986 B1* | 8/2019 | Hintermeister | H04N 21/4852 |
| 11,558,440 B1* | 1/2023 | Tadesse | H04L 65/403 |
| 2014/0372908 A1* | 12/2014 | Kashi | H04L 65/1089 715/753 |
| 2015/0381684 A1* | 12/2015 | HuangFu | H04L 65/1089 709/217 |

* cited by examiner

Primary Examiner — Clayton R Williams
(74) Attorney, Agent, or Firm — Kunzler Bean & Adamson

(57) ABSTRACT

Apparatuses, methods, systems, and program products are disclosed for enabling smart communications within prerecorded communication. An apparatus includes a processor, and coupled to the processor, a memory that stores code executable by the processor to playback a prerecorded communication from at least one participant, enable at least one non-participant to mark a position within the prerecorded communication, capture a contextual portion of the prerecorded communication preceding the marked position, and convey at least one communicative input from the non-participant and the contextual portion to at least one invitee.

20 Claims, 5 Drawing Sheets

SMART COMMUNICATIONS WITHIN PRERECORDED CONTENT

FIELD

The subject matter disclosed herein relates to communications and more particularly relates to enabling smart communications within prerecorded content.

BACKGROUND

Meetings are often recorded for persons who were not able to participate in the meeting ("non-participants"). Active participants in the meeting are likely to have had the opportunity to ask questions, respond to questions, or otherwise comment "live" or at the time of and within the appropriate context of the meeting discussion. But non-participants who are subsequently watching the prerecorded meeting obviously cannot provide their live input. Such non-participants may have questions, responses, or comments that relate to a specific discussion context. To air their questions, responses, or comments, non-participants usually need to re-build the meeting context before they can provide their input as desired.

BRIEF SUMMARY

Apparatuses, methods, systems, and program products are disclosed for enabling smart communications within prerecorded content. An apparatus, in one embodiment, includes a processor, and coupled to the processor, a memory that stores code executable by the processor to playback a prerecorded communication from at least one participant; enable at least one non-participant to mark a position within the prerecorded communication; capture a contextual portion of the prerecorded communication preceding the marked position; and convey at least one communicative input from the non-participant and the contextual portion to at least one invitee.

A method, in one embodiment, includes playing back a prerecorded communication from at least one participant, enabling at least one non-participant to mark a position within the prerecorded communication, capturing a contextual portion of the prerecorded communication preceding the marked position, and conveying at least one communicative input from the non-participant and the contextual portion to at least one invitee.

A program product, in one embodiment, includes computer readable storage medium that stores code executable by a processor. In one embodiment, the code is executable by the processor to playback a prerecorded communication from at least one participant; enable at least one non-participant to mark a position within the prerecorded communication; capture a contextual portion of the prerecorded communication preceding the marked position; and convey at least one communicative input from the non-participant and the contextual portion to at least one invitee.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be limiting of scope, the embodiments will be described and explained with additional specificity and detail using the accompanying drawings, in which.

DETAILED DESCRIPTION

Figure 1:
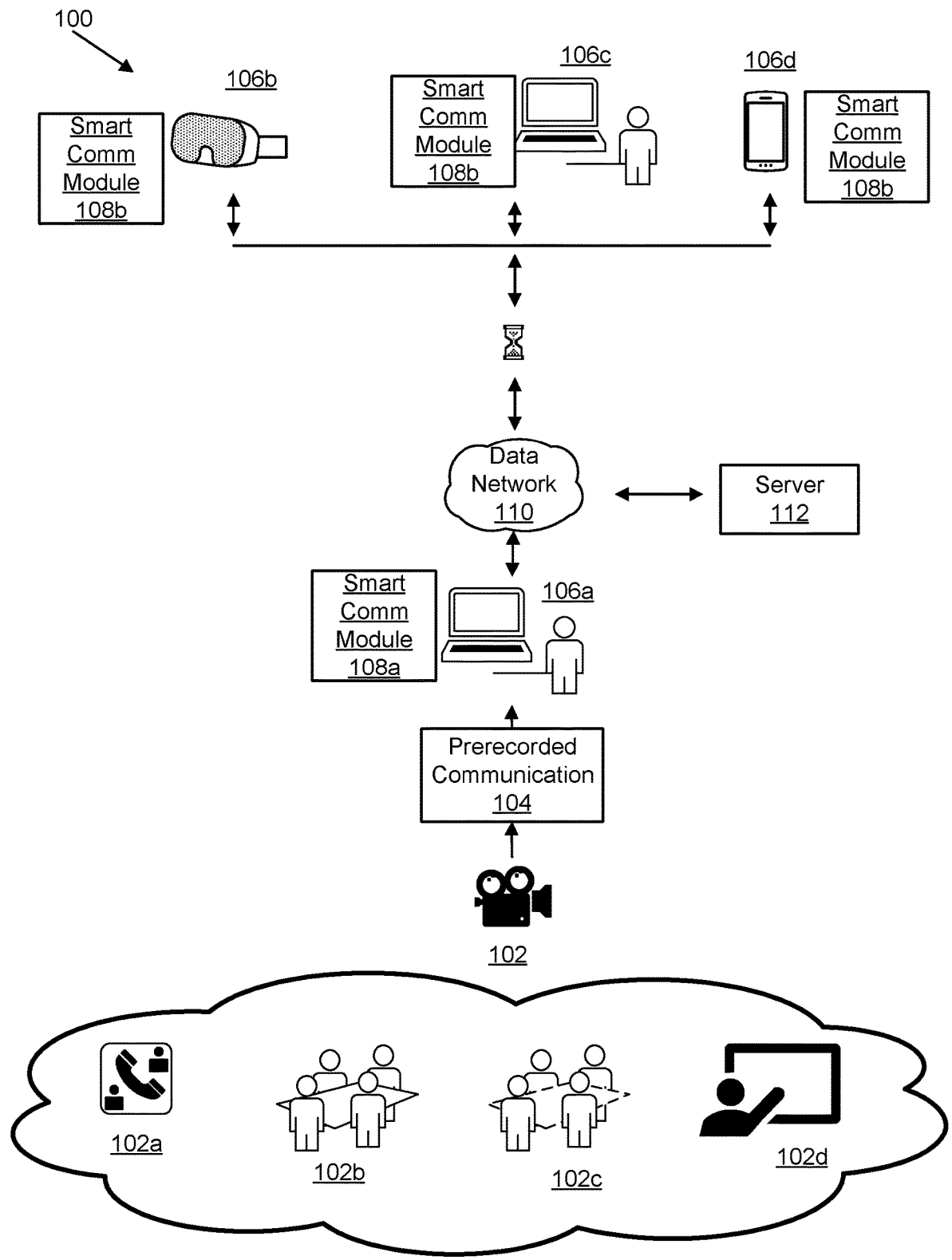
FIG. 1 is a schematic block diagram illustrating one embodiment of a system for enabling smart communications within prerecorded content.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The apparatuses, methods, systems, program products, and their respective embodiments disclosed herein facilitate and assist one-pedal driving. The description of elements in each figure may refer to elements of proceeding figures. Like numbers refer to like elements in all figures, including alternate embodiments of like elements.

FIG. 1 is a schematic block diagram illustrating one embodiment of a system for enabling smart communications within prerecorded content. In one embodiment, the system 100 includes a recording device 102, a prerecorded communication 104, a communication device 106(a-d), a smart communication module 108, a data network 108, and a server 110. Even though a specific number of recording devices 102, communication devices 104, smart communication modules 106, data networks 108, and servers 110 are depicted in FIG. 1, one of skill in the art will recognize that any number of recording devices 102, communication devices 104, smart communication modules 106, data networks 108, and servers 110 may be included in the system 100.

The recording devices 102 may include any of various apparatuses, systems, devices, hardware, software, or other mechanisms capable of recording verbal and/or visual communications (e.g., voice-recognition software, manual transcribers (e.g., stenotype machine), and/or audio/video recording devices (e.g., cameras, mobile phones)). The recording device may record a single individual or a group of individuals on phone conferences or in meetings, presentations, or the like (e.g., phone conference 102a, in-person meeting 102b, virtual or online meeting 102c, presentation 102d, or a combination of these).

The recording device 102, as used herein, ultimately produces a prerecorded communication 104, which may be used for later reference or playback. The prerecorded communication 104 may be encoded, decoded, converted to a digital or analog format or the like or combinations thereof for transmission and storage purposes and should be rendered in a human intelligible format upon replay for an invitee.

Meetings and phone conferences often include a list of invitees, which might include those who will attend at the appointed time ("participants") as well as those who do not plan to attend at the appointed time ("non-participants"). During such a meeting or call, additional non-participating individuals may be identified, who were not originally included as "invitees," but such individuals may also be included as an invitee or non-participant as described herein.

In one embodiment, the communication devices 106(a-d) include computing devices, such as desktop computers, laptop computers, personal digital assistants (PDAs), tablet computers, smart phones, smart television systems (e.g., televisions connected to the Internet), vehicle on-board computers, streaming devices, or the like. In some embodiments, the communication devices 106 include wearable devices, such as smart watches, optical head-mounted displays, or the like. In one embodiment, the communication device 106 may include a processor, and coupled to the processor, a memory that stores code executable by the processor.

The communication devices 106 may include an embodiment of the smart comm module 108. In some embodiments, the communication devices 106(a-d) may be independent components from the smart comm modules 108, and in other embodiments, may be integrated to form a single unit. The communication device 106 may comprise various processors or processor cores, memory, storage, network connectivity chips, graphics chips, audio chips, and/or the like. The smart comm module 108, in one embodiment, may be an independent module or may be an extension that adds to another computer program previously loaded on the communication device 106. The communication device 106 may be stored within an app (e.g., Microsoft Teams). The communication device 106 may include one or more GUI elements and the like to facilitate user interaction by the invitee.

In certain embodiments, the smart comm module 108 may playback a prerecorded communication 104 and enable a non-participant to review and further communicate regarding the prerecorded communication 104. In one embodiment, the non-participant may do this by manually copying and pasting portions of the prerecorded communication 104 that are relevant to questions or comments that the non-participant has or wishes to contribute at the marked point in the prerecorded communication 104 and send such portions along with comments or questions to one or more attendees or other invitees. For example, in one embodiment, the non-participant may desire to pose a question to the participant who was speaking at a particular point in the prerecorded communication 104. As discussed further herein, the smart comm module 108 may be configured to assist the non-participant in manually capturing the contextual portion immediately preceding such particular point in the prerecorded communication 104 and in sending that contextual portion along with the non-participant's question to the participant who was speaking.

In other embodiments, the smart comm module 108 may automate the identification and capture of relevant portions of the prerecorded communication 104 and automate sending comments or questions about such portions to a participant or other invitee. In this manner, the smart comm module 108 may be used to enable smart communications within prerecorded content. In one embodiment, the communication device 106a may send a portion of or the entire prerecorded communication 104 to one or more smart modules (e.g., to 106(b-d)). The communication devices 106 may access the data network 110 directly using a network connection. The smart comm module 108 and embodiments of the same are discussed in further detail regarding FIGS. 2 and 3.

The data network 110, in one embodiment, includes a digital communication network that transmits digital communications. The data network 110 may include a wireless network, such as a wireless cellular network, a local wireless network, such as a Wi-Fi network, a Bluetooth® network, a near-field communication ("NFC") network, an ad hoc network, and/or the like. The data network 110 may include a WAN, a storage area network ("SAN"), a LAN, an optical fiber network, the internet, or other digital communication network. The data network 110 may include two or more networks. The data network 110 may include one or more servers, routers, switches, and/or other networking equipment. The data network 110 may also include computer readable storage media, such as a hard disk drive, an optical drive, non-volatile memory, RAM, or the like.

In embodiments where the wireless connection is a mobile telephone/cellular network, the network may be configured as a 4G network, a 5G network, a long-term evolution ("LTE") based network, and/or the like. In such an embodiment, the mobile telephone network may create and manage wireless connections between base access units for the network and user equipment ("UE") devices for the user. The wireless connection may also employ a Wi-Fi network based on any one of the Institute of Electrical and Electronics Engineers ("IEEE") 802.11 standards.

The one or more servers 112 may be embodied as blade servers, mainframe servers, tower servers, rack servers, and/or the like. The one or more servers 112 may be configured as mail servers, web servers, application servers, FTP servers, media servers, data servers, web servers, file servers, virtual servers, and/or the like.

The server 112, in one embodiment, may provide a portion or the entirety of the prerecorded communication 104 to the communication devices 106(b-d) over the data network 110. The server 112, in another embodiment, may provide a portion or the entirety of the prerecorded communication 104 back to the communication devices 106(a) over the data network 110. In various embodiments, the server 112 may publish video content on a tangible storage medium either as recorded video content or as instructions that when executed by a video processor, graphics processor, or other similar video processing hardware generates video content.

Figure 2:
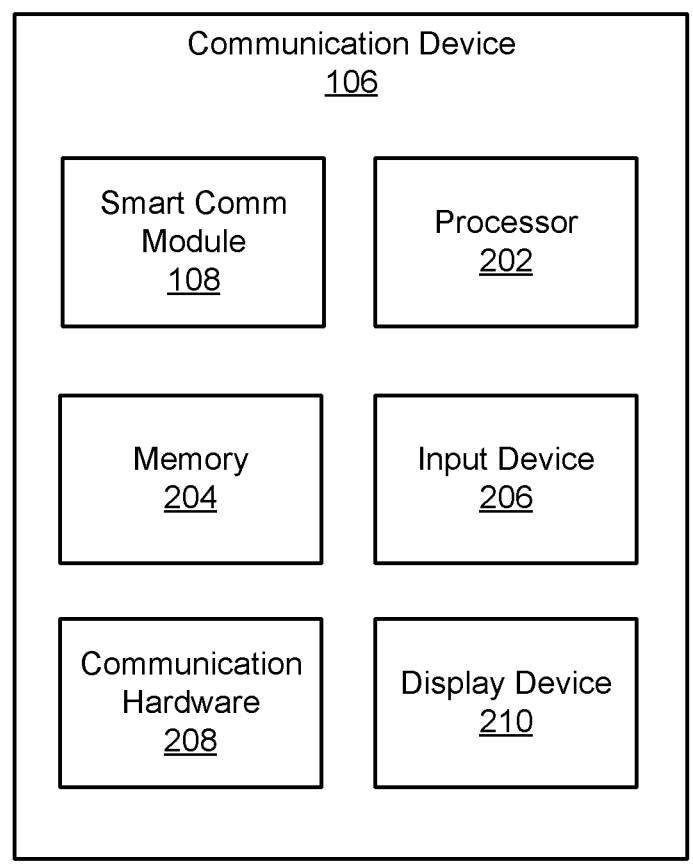
FIG. 2 is a schematic block diagram illustrating one embodiment of an apparatus including a communication device.

FIG. 2 depicts one embodiment of an apparatus 200 for enabling smart communications within prerecorded content 104. The apparatus 200 includes one embodiment of the communication device 106. Furthermore, the communication device 106 may include the smart comm module 108, a processor 202, a memory 204, an input device 206, communication hardware 208, and a display device 210. In some embodiments, the input device 206 and the display device 210 are combined into a single device, such as a touchscreen. Although the apparatus 200 depicts the communication device 106 including a specific number of smart comm modules 108, processors 202, memories 204, input devices 206, communication hardware 208, and display devices 210, one of skill in the art will recognize that any number of smart comm 108, processors 202, memories 204, input devices 206, communication hardware 208, and display devices 210, may be included in the communication device 106.

The communication devices 106 may include an embodiment of the smart comm module 108. The communication device 106 may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the communication device 106 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the communication device 106.

In certain embodiments, the smart comm module 108 may playback a prerecorded communication 104 from at least one non-participant. The smart comm module 108 may also enable at least one non-participant to mark a position within the prerecorded communication 104. This may include a point in the prerecorded communication 104 where the non-participant desires to provide communicative input (i.e., raise a question, respond, make a comment, or otherwise communicate with one or more invitees within the context of the prerecorded communication 104). In other embodiments, the participant may mark a position within the prerecorded communication 104 where the participant desires to provide communicative input.

In one embodiment, such communicative inputs may be embedded within the prerecorded communication 104. Likewise, in one embodiment, any responses to such communicative inputs may also be embedded within the prerecorded communication 104. This would have the added benefit of allowing subsequent viewers of the prerecorded communication 104 to see the communicative inputs or responses of all invitees.

In one embodiment, the smart comm module 108 may be configured to automatically capture a time-based contextual portion of the prerecorded communication 104. For example, the smart comm module 108 may recognize the marked position or the embedded non-participant communicative input and then capture the immediately preceding two minutes of the communication. This would provide some context for the non-participant communicative input. The smart comm module 108 would then convey the non-participant communicative input along with the contextual portion to at least one invitee. In some embodiments, the non-participant may select from a list of invitees to convey this information. In other embodiments, the smart comm module 108 may automatically circulate the non-participant communicative input to all invitees.

In some instances, the non-participant's communicative input or inputs may have already been addressed elsewhere within the prerecorded communication 104. In one embodiment, the smart comm module 108 may be configured to use key words, phrases, strings, etc., within the embedded non-participant communicative input to automatically detect one or more contextual portions of the prerecorded communication 104. The smart comm module 108 may also convey metadata identifying one or more contextual portions to the non-participant. The non-participant may readily access the contextual portions via GUI buttons or the like. The smart comm module 108 may also gather the identified contextual portions into a queue to enable the non-participant to review such portions, perhaps in abbreviated format.

In one embodiment, the smart comm module 108 may be configured to automatically capture one or more contextual portion of the prerecorded communication 104 based upon potentially relevant key words, phrases, strings, etc., within the embedded non-participant communicative input and convey this contextual portion along with the non-participant communicative input to the invitee. In this embodiment, the smart comm module 108 may also include metadata associated with the contextual portion to enable an invitee to go directly to the location where the contextual portion was captured within the complete prerecorded communication 104.

In some embodiments, the non-participant could mark multiple locations or could embed multiple communicative inputs within the prerecorded communication 104. The non-participant could send references to the marked locations and/or send the multiple communicative inputs along with multiple contextual portions to the invitee or invitees. As mentioned previously, the smart comm module 108 may also be configured to collect multiple communicative inputs within a queue, which the non-participant could review before sending to an invitee. The smart comm module 108 may also include metadata associated with the contextual portion to enable an invitee to go directly to the location where the contextual portion was captured within the complete prerecorded communication 104. In this manner, the smart comm module 108 may be used to enable smart communications within the prerecorded communication 104.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the smart communication module 108, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like. In some embodiments, the memory 204 includes both volatile and non-volatile computer storage media.

In some embodiments, the memory 204 stores data and/or metadata relating to enabling smart communications within prerecorded content. In some embodiments, the memory 204 also stores program code and related data, such as an operating system or other controller algorithms operating on the communication device 106.

The communication device 106 may use the smart communication module 108 for enabling smart communications within prerecorded content 104. As may be appreciated, the smart communication module 108 may include computer hardware, computer software, or a combination of both computer hardware and computer software. For example, the smart communication module 108 may include circuitry, or a processor, used to playback a prerecorded communication 104 from at least one participant. As another example, the smart communication module 108 may include computer program code that enables at least one non-participant to mark a position within the prerecorded communication 104. As a further example, the smart communication module 108 may include computer program code that captures a contextual portion of the prerecorded communication 104 preceding the marked position and conveys at least one communicative input from the non-participant and the contextual portion to at least one invitee.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In one embodiment, the input device 206 includes voice recognition software to record the non-participant communicative input into an entry box or to embed the communicative input directly into the prerecorded communication 104. In some embodiments, the input device 206 includes two or more different devices, such as a keyboard and a touch panel.

In certain embodiments, the input device 206 may be used to input strings, key words, or phrases used to search for portions of potentially related contextual portions of prerecorded communication 104. In various embodiments, the input device 206 may be used to input user specific adjustments, such as a defined time frame for capturing contextual portions of the prerecorded communication 104. For example, if a non-participant wants to pose a question along with a two minute contextual portion to a particular invitee, the non-participant may set the time period to capture the two minutes of contextual portion preceding the marked point or embedded question within the prerecorded communication 104. The smart comm module 108 would then automatically capture two minutes of contextual portion before each communicative input.

The communication hardware 208 may facilitate communication with other devices. For example, the communication hardware 208 may enable communication via Bluetooth®, Wi-Fi, WAN, and so forth. The wireless connection may also employ a Wi-Fi network based on any one of the Institute of Electrical and Electronics Engineers ("IEEE") 802.11 standards. In some embodiments, the communication hardware 208 may enable communication with the server 112. In various embodiments, the server 112 provides portions of or the entire prerecorded communication 104.

The display device 210, in one embodiment, may include any known electronically controllable display or display device. The display device 210 may be designed to output visual and/or audible signals. In some embodiments, the display device 210 includes an electronic display capable of outputting visual data to an invitee. For example, the display device 210 may include, but is not limited to, an LCD display, an LED display, an OLED display, a projector, or similar display device capable of outputting communicative input to an invitee. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action, such as posing a question or response.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the smart communication module 108.

Figure 3:
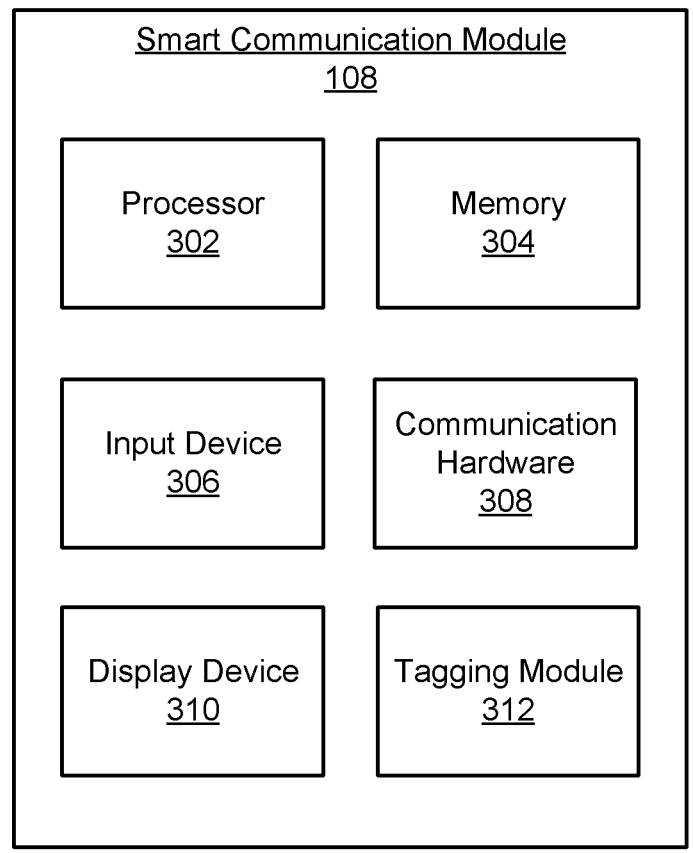
FIG. 3 is a schematic block diagram illustrating one embodiment of another apparatus including a smart communication module.

FIG. 3 depicts a schematic block diagram illustrating one embodiment of an apparatus 300, which includes one embodiment of the smart comm module 108. Smart comm module 108 may include processor 302, memory 304, input device 306, communication hardware 308, display device 310, which may function substantially similar to processor 202, memory 204, input device 206, communication hardware 208, display device 210, respectively, as discussed regarding FIG. 2. Smart comm module 108 may also include a tagging module 312.

Agendas in many meetings, phone conferences, or the like often include topics that require follow-up tasks and action items for such tasks are typically assigned. Such action items may be assigned to participants, non-participants, or subsequent invitees. The tagging module 312 may be configured to be used by any communication device 106 to tag action items for tasks that may be identified in the prerecorded communication 104 or in modification thereto by other invitees and to convey notifications to those invitees that were assigned tasks during the meeting, conference call, etc. In the context of FIG. 1, for example, a participant of a prerecorded communication 104 may present information and tag related action items for other invitees. The tagged action item or items and related contextual portion or portions may be automatically conveyed to the assigned invitee or invitees. The communication device 106a and smart communication module 108a may be configured to include tagging data, which may be stored as metadata and subsequently sent to other invitees, who may respond via communication devices 106(b-d) and associated smart communication modules 108b. In this manner, the smart communication module 108 may enable smart communications within prerecorded content 104.

Consistent with the embodiments discussed herein, participants, non-participants, and other invitees may each desire to provide a communicative response another invitee's communicative input or in response to the prerecorded communication 104. The smart communication module 108, in one embodiment, may be configured to process such communicative responses and any responses thereto, and so on, as discussed in other embodiments herein. In one embodiment, for example, a single participant could launch a completely virtual meeting (no other contemporaneous participants) by sending a prerecorded communication 104, which may include tagged action items for tasks, responses to questions, etc., to other participants, who in turn may embed communicative input or inputs and communicative response or responses within the prerecorded communication 104. In this manner, the smart communication module 108 may enable smart communications within prerecorded content 104.

Figure 4:
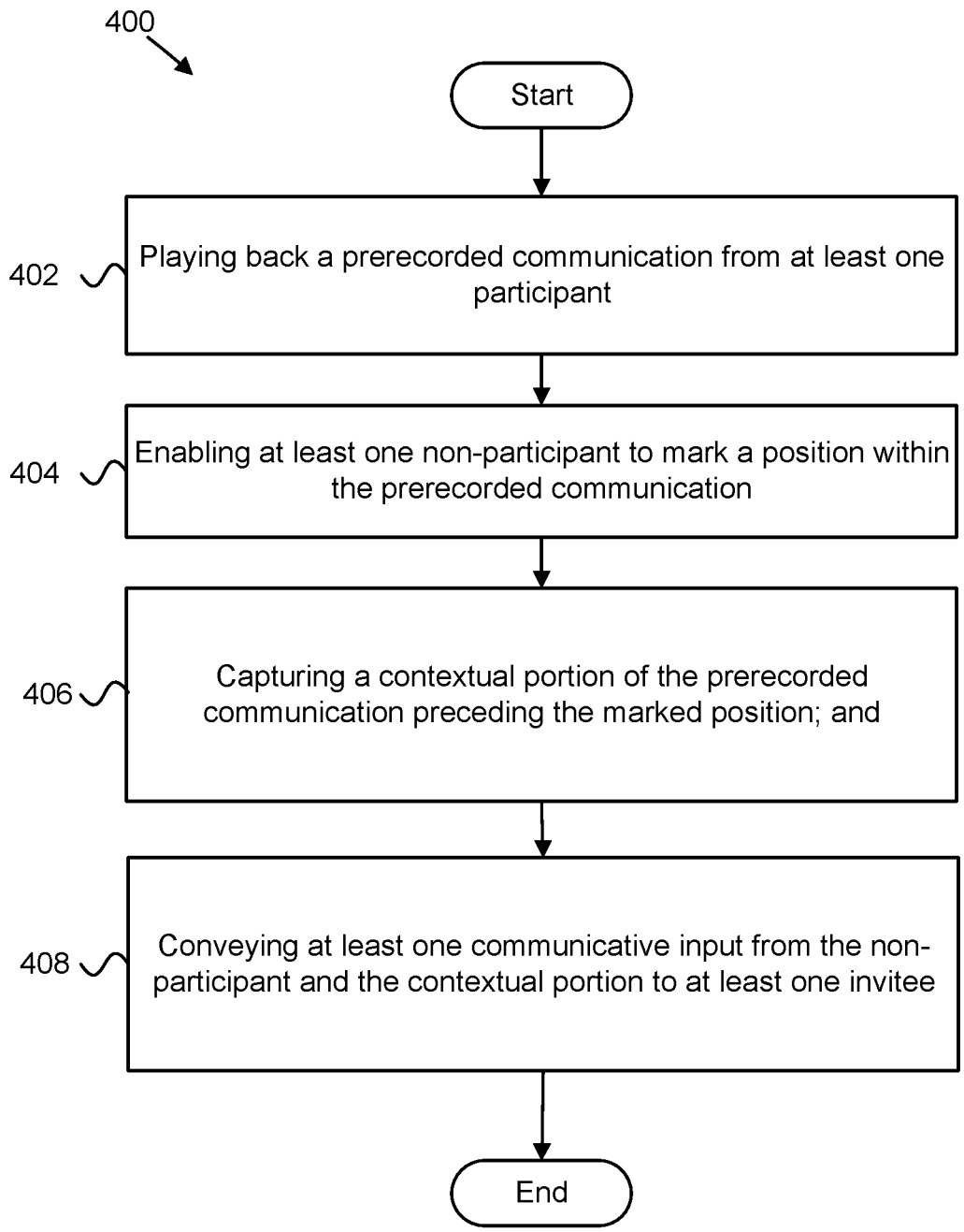
FIG. 4 is a schematic flow chart diagram illustrating one embodiment of a method for enabling smart communications within prerecorded content.

FIG. 4 is a schematic flow chart diagram illustrating an embodiment of a method 400 for enabling smart communications within prerecorded content. In some embodiments, the method 400 is performed by an apparatus, such as the communication device 106. In other embodiments, the method 400 may be performed by a module, such as the smart communication module 108. In certain embodiments, the method 400 may be performed by a processor executing program code, for example, a microcontroller, a microprocessor, a CPU, a GPU, an auxiliary processing unit, a FPGA, or the like.

In one embodiment, the method 400 begins and plays back 402, by processor, a prerecorded communication from at least one participant. The method 400 continues and enables 404 at least one non-participant to mark a position within the prerecorded communication. The method 400 continues and captures 406 a contextual portion of the prerecorded communication preceding the marked position. The method 400 continues and conveys 408 at least one communicative input from the non-participant and the contextual portion to at least one invitee.

In some embodiments, the non-participant selects the at least one invitee. In one embodiment, the method may include embedding the non-participant communicative input into the prerecorded communication. In one embodiment, the method may include embedding into the prerecorded communication a responsive input from the participant in response to the non-participant communicative input. In some embodiments, the method further includes embedding multiple non-participant communicative inputs into the prerecorded communication and to store the multiple non-participant communicative inputs in a queue. In one embodiment, the method further includes allowing the at least one non-participant to review the queue before one or more of the multiple non-participant communicative inputs are conveyed to the at least one participant.

In one embodiment, the method may include detecting, within the prerecorded communication, content potentially related to the at least one non-participant communicative input. In some embodiments, the method further includes referring the at least one non-participant to the content potentially related to the at least one non-participant communicative input.

In one embodiment, the method may include identifying at least one previously tagged item within the prerecorded communication 104. In some embodiments, the at least one previously tagged item pertains to a specific invitee.

Figure 5:
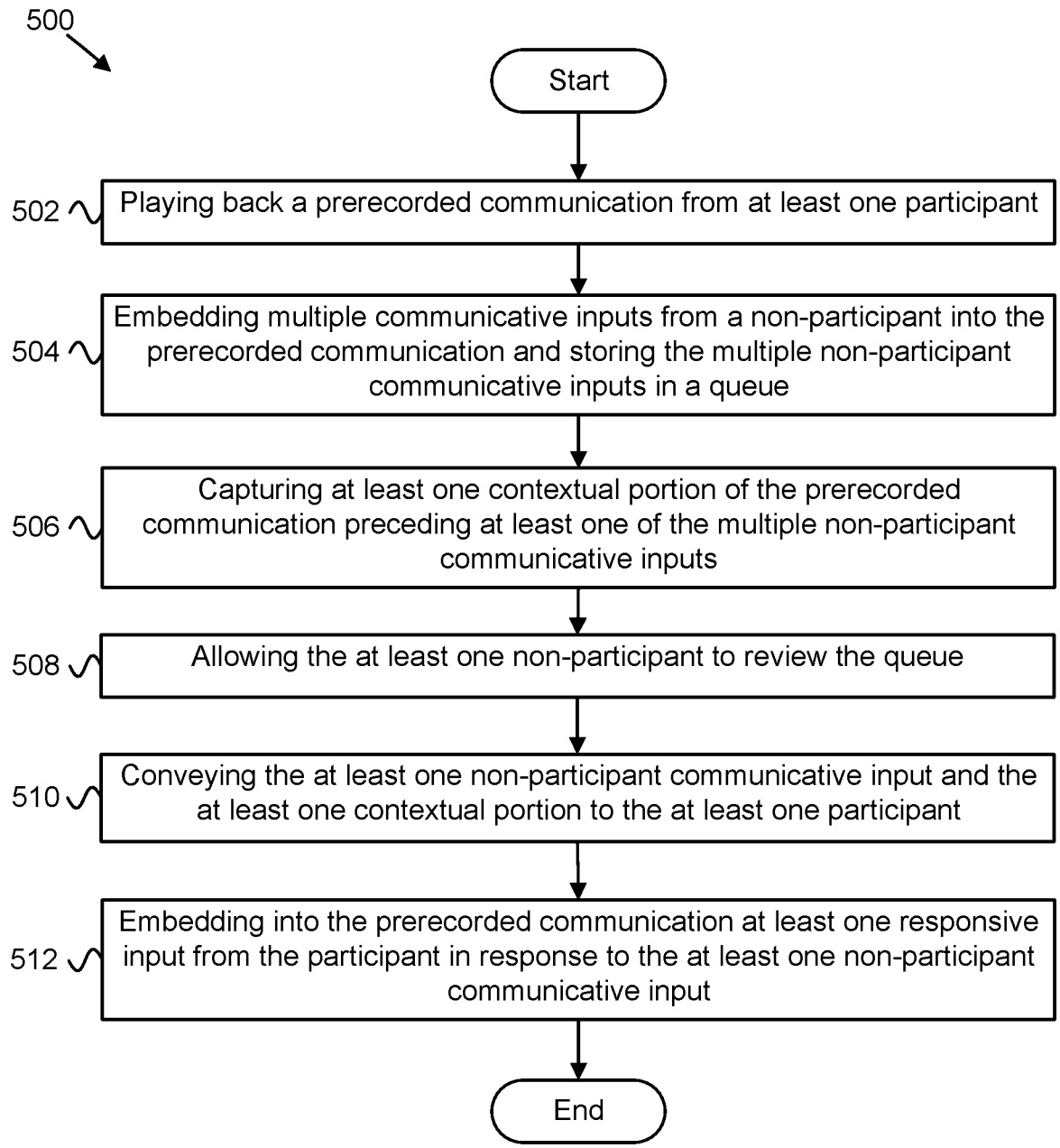
FIG. 5 is a schematic flow chart diagram illustrating one embodiment of another method for enabling smart communications within prerecorded content.

FIG. 5 is a schematic flow chart diagram illustrating an embodiment of a method 500 for enabling smart communications within prerecorded content. In some embodiments, the method 500 is performed by an apparatus, such as the communication device 106. In other embodiments, the method 500 may be performed by a module, such as the smart communication module 108. In certain embodiments, the method 500 may be performed by a processor executing program code, for example, a microcontroller, a microprocessor, a CPU, a GPU, an auxiliary processing unit, a FPGA, or the like.

In one embodiment, the method 500 begins and plays back 502, by processor, a prerecorded communication from at least one participant. The method 500 continues and embeds 504 multiple communicative inputs from a non-participant into the prerecorded communication and stores the multiple non-participant communicative inputs in a queue. The method 500 continues and captures 506 at least one contextual portion of the prerecorded communication preceding at least one of the multiple non-participant communicative inputs. The method 500 continues and allows 508 the at least one non-participant to review the queue. The method 500 continues and conveys 510 at least one non-participant communicative input and at least one contextual portion to at least one participant. The method 500 continues and embeds 512 into the prerecorded communication at least one responsive input from the participant in response to at least one non-participant communicative input.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor; and
   a memory, coupled to the processor, that stores code executable by the processor to:
   playback a prerecorded communication from at least one participant;
   enable at least one non-participant to mark a position within the prerecorded communication;
   capture a contextual portion of the prerecorded communication preceding the marked position, the contextual portion having a start point that is a predetermined value before the position that the at least one non-participant marked; and
   convey at least one communicative input from the non-participant and the contextual portion to at least one invitee.

2. The apparatus of claim 1, wherein the non-participant selects the at least one invitee or the predetermined value.

3. The apparatus of claim 1, wherein the code is executable by the processor to embed the non-participant communicative input into the prerecorded communication.

4. The apparatus of claim 3, wherein the code is executable by the processor to embed into the prerecorded communication a responsive input from the participant in response to the non-participant communicative input.

5. The apparatus of claim 4, wherein the code is executable by the processor to embed multiple non-participant communicative inputs into the prerecorded communication and to store the multiple non-participant communicative inputs in a queue.

6. The apparatus of claim 5, wherein the code is executable by the processor to allow the at least one non-participant to review the queue before one or more of the multiple non-participant communicative inputs are conveyed to the at least one participant.

7. The apparatus of claim 1, wherein the code is executable by the processor to detect, within the prerecorded communication, content potentially related to the at least one non-participant communicative input.

8. The apparatus of claim 7, wherein the code is executable by the processor to refer the at least one non-participant to the content potentially related to the at least one non-participant communicative input.

9. The apparatus of claim 1, wherein the code is executable by the processor to identify at least one previously tagged item within the prerecorded communication.

10. The apparatus of claim 9, wherein the at least one previously tagged item pertains to a specific invitee.

11. A method comprising:
    Playing back a prerecorded communication from at least one participant;
    Enabling at least one non-participant to mark a position within the prerecorded communication;
    Capturing a contextual portion of the prerecorded communication preceding the marked position, the contextual portion having a start point that is a predetermined value before the position that the at least one non-participant marked; and
    Conveying at least one communicative input from the non-participant and the contextual portion to at least one invitee.

12. The method of claim 11, wherein the non-participant selects the at least one invitee or the predetermined value.

13. The method of claim 11 further comprising embedding the non-participant communicative input into the prerecorded communication.

14. The method of claim 13 further comprising embedding into the prerecorded communication a responsive input from the participant in response to the non-participant communicative input.

15. The method of claim 11 further comprising embedding multiple non-participant communicative inputs into the prerecorded communication and storing the multiple non-participant communicative inputs in a queue.

16. The method of claim 15 further comprising allowing the at least one non-participant to review the queue before conveying one or more of the multiple non-participant communicative inputs to the at least one participant.

17. The method of claim 11 further comprising detecting, within the prerecorded communication, content potentially related to the at least one non-participant communicative input.

18. The method of claim 17 further comprising referring the at least one non-participant to the content potentially related to the at least one non-participant communicative input.

19. The method of claim 11 further comprising identifying at least one previously tagged item within the prerecorded communication and notifying a specific invitee of the at least one previously tagged item.

20. A program product comprising a non-transitory computer readable storage medium that stores code executable by a processor, the executable code comprising code to:
    playback a prerecorded communication from at least one participant;
    enable at least one non-participant to mark a position within the prerecorded communication;
    capture a contextual portion of the prerecorded communication preceding the marked position, the contextual portion having a start point that is a predetermined value before the position that the at least one non-participant marked; and
    convey at least one communicative input from the non-participant and the contextual portion to at least one invitee.

* * * * *